United States Patent [19]

Fardal et al.

[11] Patent Number: 4,629,122

[45] Date of Patent: Dec. 16, 1986

[54] IN-FIELD FRACTIONATION PROCESS FOR GREEN VEGETATION CROPS

[75] Inventors: Randolph G. Fardal, Lisle; George B. Cicci, Burr Ridge, both of Ill.; Man K. Leung, Richmond, Calif.

[73] Assignee: Navistar International Corporation, Chicago, Ill.

[21] Appl. No.: 474,773

[22] Filed: Mar. 14, 1983

[51] Int. Cl.[4] .................... B05B 13/00; A01D 43/00; A23J 1/14
[52] U.S. Cl. .................................... 239/155; 56/13.5; 239/172; 426/656; 530/370
[58] Field of Search ..................... 56/13.5, 1; 426/635, 426/636, 656; 260/112 R; 239/172, 155

[56] References Cited

U.S. PATENT DOCUMENTS

| | | | |
|---|---|---|---|
| 3,823,128 | 7/1974 | Bickoff et al. | 426/636 X |
| 4,052,003 | 10/1977 | Steffen | 239/155 X |
| 4,109,448 | 8/1978 | Kline | 56/13.5 |
| 4,132,941 | 1/1979 | Sousek et al. | 239/155 X |
| 4,421,682 | 12/1983 | Edwards et al. | 426/656 X |

*Primary Examiner*—Andres Kashnikow
*Attorney, Agent, or Firm*—Dennis K. Sullivan; F. David Au Buchon

[57] ABSTRACT

A field-going machine is disclosed for separating the green liquid fraction of a green vegetation crop into leaf protein concentrate fraction and a brown liquid fraction, where a portion of the brown liquid fraction is heated and then recirculated to mix with the incoming green liquid fraction to cause its coagulation.

10 Claims, 3 Drawing Figures

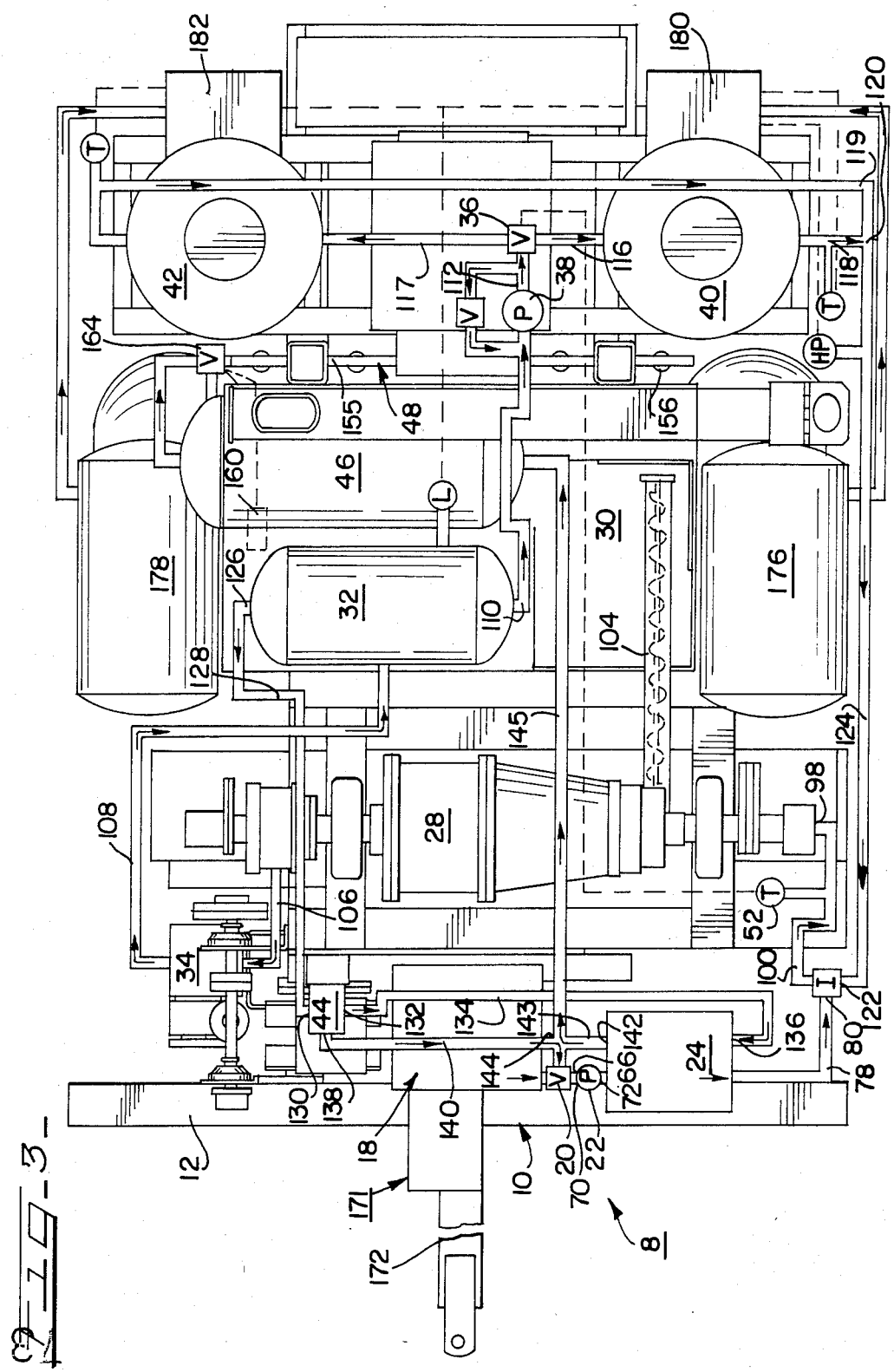

IN-FIELD FRACTIONATION PROCESS FOR GREEN VEGETATION CROPS

BACKGROUND OF THE INVENTION

This invention relates to a method and apparatus for in-field processing the proteinaceous plant juice fraction of green-plant vegetation to obtain a leaf protein concentrate fraction and a deproteinized liquid.

It is conventional practice to cut green-plant vegetation, such as alfalfa, and to haul it from the field to a processing plant by truck. In a typical situation from two to six hours may lapse from the time of first hauling until plant processing actually commences. Various processes are followed in stationary commercial plant, such as disclosed in following patents:

| Patentee | U.S. Pat. No. |
| --- | --- |
| Peebles et al. | 2,552,343 |
| Peebles et al. | 2,607 688 |
| Bickoff et al. | 3,684,520 |
| Batley | 3,775,133 |
| Bickoff et al. | 3,823,128 |

There is described in U.S. Pat. No. 4,109,448, which issued to Donald C. Kline and which is assigned to the same assignee as this invention, the method and apparatus for processing green-plant vegetation, such as alfalfa, in the field. The Kline patent discloses that before a vegetation plant such as alfalfa can be processed at the stationary plants, it is necessary to dehydrate the alfalfa. This dehydration of the alfalfa causes a deterioration in the carotene and xanthophyll content of the alfalfa. The Kline invention avoids this deterioration by employing a field-going machine capable of field processing the alfalfa to contain a fibrous fraction and a green liquid fraction. The green liquid fraction is further treated to obtain a protein component and a deproteinized brown liquid component, whereby the deproteinized brown liquid component is applied onto the field as the machine moves through the The Kline patent discribes a machine having a harvesting head assembly mounted on the front of the vehicle for cutting the alfalfa and a conveying means to deliver the alfalfa rearwardly to a macerator which shreds the harvested alfalfa. The macerated alfalfa is separated into fibrous and green liquid fractions by a dewatering press which is connected to the macerator by a conveyor. The fibrous fraction is then blown rearwardly into a trailer pulled behind the vehicle. This fibrous fraction has a 65 to 68% moisture content which is quite suitable for animal feed. The liquid fraction has a green color and consists of 90% water. The green liquid fraction contains chloroplastic proteins, chlorophyll, carotene, xanthophyll, and other carotenoids, lipids, mineral compounds and cytoplasmic proteins.

Kline patent discloses heating the green liquid fraction to a predetermined temperature and pumping it to a holding tank where the protein fraction floats on top of the deproteinized brown liquid. The leaf protein concentrate is skimmed from the deproteinized liquid and is collected in a storage container mounted on the side of the vehicle. The deproteinized liquid is then applied to the ground beneath the vehicle by its sprayer assembly.

The leaf protein concentrate is quite valuable as a feed supplement consisting of chloroplastic proteins, chlorophyll, carotene, zanthophyll, lipids, and cytoplasmic proteins. Most of the water and minerals contained in the green juice liquid fraction is separated into the deproteinized liquid which has a brown color.

In the Kline patent it is described that the green liquid fraction may be heated by injecting steam into the liquid fraction to promote coagulation. Kline suggests that the steam can be generated from the cooling system of the engine where it is necessary to carry make-up water for the vehicle. One of the objects of this invention is to avoid the necessity of carrying make-up water and of heating such make-up water for producing steam.

SUMMARY OF THE INVENTION

The primary object of this invention is to provide an energy efficient method and apparatus of providing steam for promoting coagulation of the green liquid fraction of green vegetation crop. This object is accomplished by recycling a portion of the deprotenized brown liquid fraction and heating it slightly to provide steam for promoting coagulation of the green liquid fraction.

Another object of the present invention is to provide a novel method and apparatus for automatically switching the machine's processing system into a stand-by recirculation mode to prevent the brown liquid fraction from flooding the field when the machine stops.

A further object of this invention is to provide an automatic standby system that maintains the system in a state of readiness and flushes the system's components to present stagnation and fouling of the components.

DESCRIPTION OF DRAWINGS

For a better understanding of this invention, reference should be made to the accompanying drawings, in which:

FIG. 3 is a top-plan view of the machine depicted in FIG. 2.

DESCRIPTION OF THE PREFERRED EMBODIMENT

Figure 1:
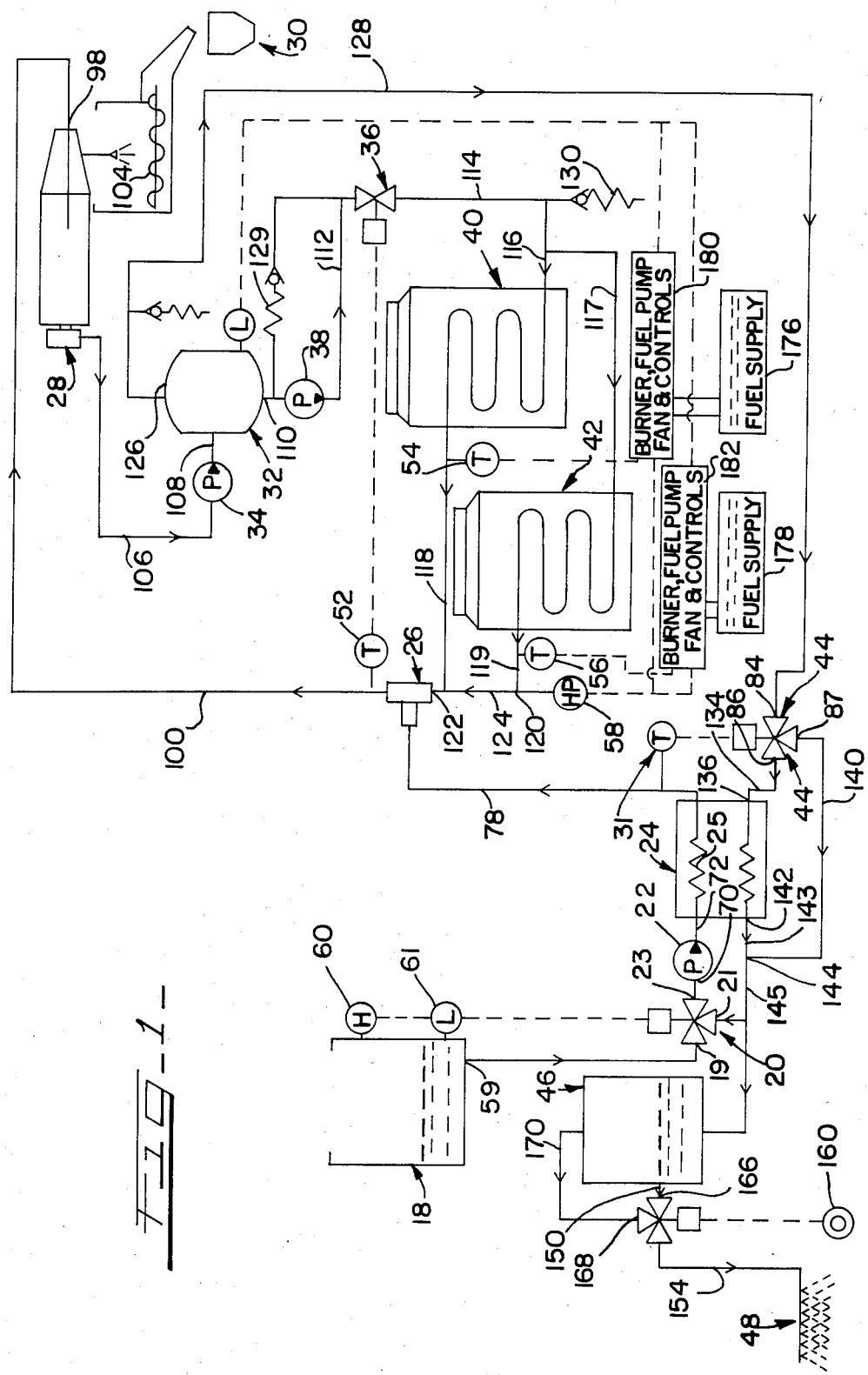
FIG. 1 is a flow diagram which illustrates the process and apparatus embodying the principles of this invention.
Figure 2:
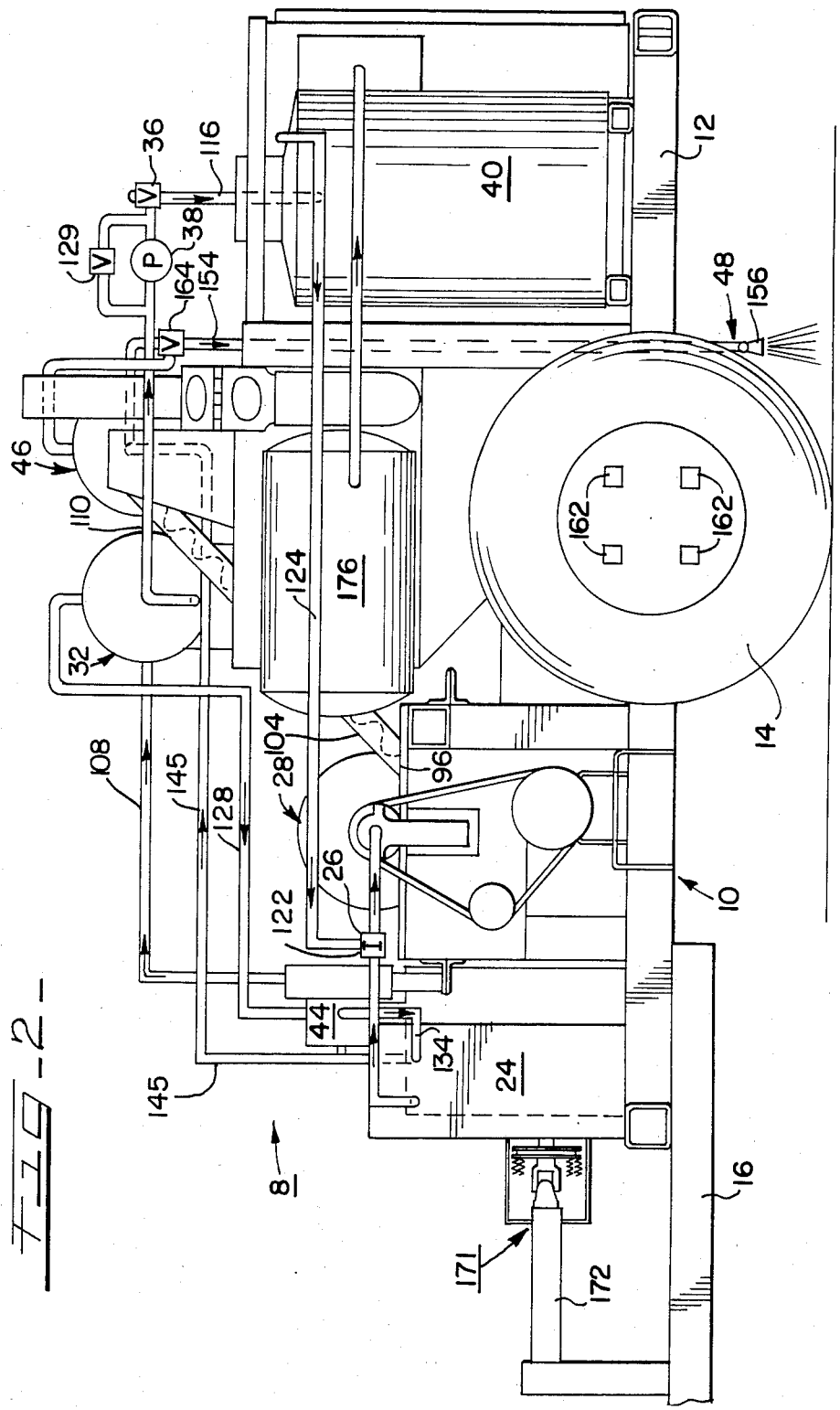
FIG. 2 is a side-elevational view of an in-field processing machine which illustrates the preferred embodiment of this invention.

Referring to FIG. 1, there is shown a flow diagram which illustrates the process and apparatus embodying the principles of this invention. All of the components illustrated in FIG. 1 are mounted on a trailer, generally designated by the reference 10, as depicted in FIGS. 2 and 3. Trailer 10 has an elongated frame 12 which is made transportable by virtue of a pair of wheels 14. The trailer is adapted to be pulled by means of a conventional trailer hitch (not shown) mounted on forward extending arm member 16.

The trailer hitch is connected to the rear of a fiber processing machine (not shown) that would either be self-propelled or towed behind a farm tractor. The fiber processing machine would include a harvesting head assembly mounted on its front end for cutting green vegetation, such as alfalfa; a means to convey the alfalfa rearwardly to a macerator which shreds the harvested alfalfa; and a fiber press that separates the macerated alfalfa into fibrous and liquid fractions. The fibrous fraction is blown into a wagon towed adjacent the fiber processing machine. The green liquid fraction would be delivered to the field-going proteinaceous liquid processing machine 8 illustrated in FIGS. 2 and 3. As previously mentioned, a machine for cutting green vegatation, macerating it, and then separating it into fibrous and liquid fractions by a dewatering process is described in Kline U.S. Pat. No. 4,109,448.

The green liquid fraction is delivered to green juice collector tank 18, which is mounted on the forward end of trailer 10. The green liquid fraction flows from the bottom of green juice collector tank 18 through selector valve 20. The liquid exiting from selector valve 20 is delivered to inlet pump 22 which propels the liquid through heat exchanger 24 and into injector 26 where it is mixed with steam to cause the proteins contained in the green liquid fraction to coagulate. The resulting coagulum travels from the injector 26 to a centrifuge separator 28. As will be explained further hereinafter, the centrifuge separator 28 divides the coagulum into a proteinaceous fraction and a brown liquid fraction.

The proteinaceous fraction is discharged into the protein concentrate collection tank 30.

The brown liquid fraction exiting from the centrifuge 28 is delivered to priority tank 32 by means of booster pump 34. A portion of the brown liquid fraction in priority tank 32 is drawn from its bottom port 110 and pumped through a flow regulator valve 36 by boiler pump 38. The brown liquid fraction which is pumped through flow regulator valve 36 splits into two paths, one path passes through boiler 40 and the other passes through boiler 42. It will be appreciated that the brown liquid fraction entering boilers 40 and 42 is already at a relatively high temperature. The purpose of boilers 40, 42 is to raise the temperature of the recirculated brown liquid fraction sufficiently to cause it to transform into steam when introduced into injector 26.

The remaining portion of the brown liquid fraction not needed for recirculating to generate steam, exits from priority tank 32 through its upper port 126 and flows through conduit 128 which connects to the input port 84 for divertor valve 44. Divertor valve 44 has two exit ports. One exit port 86 is connected to heat exchanger 24 and the other exit port 87 is connected to a bypass conduit 140 which flows around heat exchanger 24. The brown liquid fraction passing through the heat exchanger 24 exits from outlet 142 and recombines with the bypass portion at junction 144, from which it is delivered to spray reservoir 46. The spray reservoir 46 feeds a spray discharge assembly 48 which distributes the brown liquid fraction onto the ground beneath the trailer 10.

One of the important features of this invention is to transfer some the heat of the exiting brown liquid fraction to raise the temperature of the incoming green liquid fraction prior to its introduction into injector 26. This fuel economy step is accomplished by diverting a portion of brown liquid fraction exiting upper port 126 of priority tank 32 through heat exchanger 24. The amount of brown liquid fraction passing through heat exchanger 24 is determined by the setting of divertor valve 44. This setting is automatically controlled by a temperature sensor 31, which measures the temperature of the green liquid fraction exiting from heat exchanger 24 and which sends a signal to divertor valve 44 to automatically reset its position to continuously cause the green liquid fraction entering injector 26 to be maintained at a predetermined temperature. This predetermined temperature is set around 60° C. which is at the lowest end of the temperature range at which coagulation of the green liquid fraction commences.

The temperature of the recirculated brown liquid fraction is maintained at a constant coagulating temperature of 90° C. by a temperature control sensor 52 that monitors the temperature of the coagulum exiting injector 26 and sends a signal to adjust the flow rate of flow regulator valve 36 accordingly. The temperatures of the fluid exiting the boilers 40 and 42 are held steady by thermostats 54 and 56, respectively. The broilers' pressure is monitored by high pressure sensor 58.

An alternative means of controlling the coagulum temperature would be to use the temperature control sensor 52 to control the fluid outlet temperature of boilers 40 and 42. This arrangement would permit the elimination of flow regulator valve 36.

From the foregoing description it will be appreciated that this invention permits substantial fuel savings by using the brown liquid fraction to both preheat the green liquid fraction and to provide a source for generating steam for the purpose of coagulating the green liquid fraction. The savings in fuel is not only important for economical operation of the fractionation process but reduces the amount of fuel that must be carried on trailer 10. Furthermore, by using the brown liquid fraction as the source for steam, it is unnecessary to carry on trailer 10 any supplemental water tank, which would have to be replenished with with water.

When the operator is finished with the daily field processing operation, the green juice collector tank 18 is filled with fresh water and the system is permitted to operate long enough to have the fresh water circulate through all its components to prevent fouling and clogging. When the in-field processing machine is to be used again, some fresh water would be contained within the system.

To prepare the machine for operation, selector valve 20 is manually set to close off inlet port 19 and open inlet port 21 to thereby cause the fluid coming from divertor valve 44 and heat exchange 24 to be recirculated through its outlet port 23 where recirculated fluid passes through inlet pump 22 and the coil 25 of heat exchanger 24. The operator monitors the preparation cycle by checking the boiler temperature indicated on thermostats 54 and 56. When the operator sees that the boiler temperatures have stabilized and when the coagulum temperature sensor 52 reaches 90° C., he manually switches selector valve 20 to the automatic mode. In the automatic mode, inlet port 19 is opened and port 21 is closed. The selector valve 20 will continue to recirculate the fresh water through the system until the fiber processing machine cuts a sufficient amount of green vegetation to raise the level of the green liquid fraction in the green juice collector tank 18 to actuate its upper level sensor 60.

When inlet port 19 is connected, the green liquid fraction in collector tank 18 is drawn off from an outlet opening 59 in the bottom of tank 18. Should the level of green liquid fraction drop to the position of the low level sensor 61, the low level sensor 61 sends a signal to selector valve 20 which would reconnect it to the standby mode where inlet port 19 would be shut off and inlet port 21 would be opened.

The components diagramatically depicted in FIG. 1 are shown in FIGS. 2 and 3 assembled on frame 12 of trailer 10. The green juice collection tank 18 (FIG. 3) is mounted at the forward end of frame 12. The high level and low level sensor 60 and 61, respectively, are contained (not shown in FIGS. 2 and 3) within the tank 18 and are operatively connected to selector valve 20. Selector valve 20 is mounted below collector tank 18 and connected to conduit 66, where conduit 66 connects to the inlet port 70 of inlet pump 22. The selector valve 20 is a commercially available valve, such as Pittsburgh Brass Mfg. Co. model MP-E-16-S-2.

The inlet pump 22 delivers the green liquid fraction through conduit 72 to one of the two inlets of heat exchanger 24. One of the two outlets of heat exchanger 24 connects by conduit 78 to the inlet 80 of injector 26. Divertor valve 44 is a three-way valve having an inlet 84 and two outlets 86, 87, where outlet 86 connects to inlet 136 of heat exchanger 24 and outlet 87 bypasses heat exchanger 24 via conduit 140. Divertor valve 44 could be any of the number commercially available valve such as model 1606 manufactured by Honeywell Inc. The temperature of the preheated green liquid fraction is monitored by temperature sensor 31 (not shown in FIGS. 2 and 3) which operates valve 44 to modulate the amount of brown liquid fraction delivered to the heat exchanger 24 and the amount to be bypassed around the heat exchanger in order to maintain the green liquid fraction at a fixed temperature of around 65° C.

Mounted transversely across the trailer 10 on upper platform 96 is centrifuge separator 28. This separator could be selected from several commercially available units. A suitable centrifuge separator is model NX-314, manufactured by Alfa-Laval, Inc. The input to the centrifuge 98 is connected to the output of injector 26 via conduit 100. Centrifuge separator 28 is designed to separate the leaf protein concentrate fraction from the liquid fraction. In its operation, the leaf protein concentrate fraction is delivered to radial openings (not shown), and the leaf protein fraction exiting these openings falls onto a continuously operating auger 104 which delivers the proteinaceous material to the protein fraction collection tank 30.

The brown liquid fraction is drawn off the end opposite to the input end of centrifuge separator 28 and is delivered through conduit 106 to the inlet of booster pump 34. The output of booster pump 34 is delivered through conduit 108 to priority tank 32. The portion of the brown liquid fraction used for recirculating to provide steam is drawn off the bottom outlet 110 of priority tank 32 through conduit 111 which connects to boiler pump 38. The brown liquid fraction is delivered by boiler pump 38 through conduit 112 to flow regulator valve 36.

Conduit 114 delivers the brown liquid fraction from the flow regulator valve 36 to parallel path conduits 116 and 117, which feed the brown liquid fraction into the pair of boilers 40 and 42, respectively. The two conduits 118 and 119 exiting from the boilers 40 and 42, respectively, are coupled together at junction 120 for connection to inlet 122 of injector 26 through conduit 124. The pressure of the recirculated brown liquid fraction is safety limited at two separate places by relief valves 129 and 130.

The other portion of the brown liquid fraction is delivered out of the port 126 of priority tank 32 through conduit 128 to the inlet 84 of divertor valve 44. Outlet 86 of divertor valve 44 is connected through conduit 134 to inlet 136 of heat exchanger 24. The other outlet 87 of the divertor valve 44 bypasses the heat exchanger via conduit 140. The outlet 142 of heat exchanger 24 connects via conduit 143 to conduit 140 at coupler 144 to recombine the brown liquid fraction that is delivered through conduit 145 to the spray reservoir 46.

The brown liquid fraction in reservoir 46 is drawn off through conduit 150 and is delivered to the rear of the machine behind the wheels 14 via conduit 154 to the spray discharge assembly 48. The spray discharge assembly 48 comprises a pipe 155 extending across the machine which carries a plurality of closely spaced spray nozzles 156 which evenly spreads the brown liquid fraction across the portion of the field directly behind the machine 8.

To avoid the possibility of flooding the portion of the field around machine 8 whenever machine 8 creeps or stops momentarily, a motion indicator device 160 (FIG. 3) is mounted on the frame 112 in direct alignment with the wheel nuts 162 of one of the pair of wheels 14. The wheel stop indicator detector 160 is an electromagnetic indicator device made by the Electro Corporation model TW12/24S3. When the machine slows to a very low rate of speed or stops, the indicator 160 which senses the rotation of wheel nuts 162, sends a signal to the three-way selector valve 164. This actuation of the selector valve shuts off inlet 166 and connects inlet 168. Conduit 170 is provided as an overflow outlet for the reservoir 46 and feeds through inlet 168. Motion indicator device 160 is set to actuate selector valve 164 whenever the speed of machine 8 drops to a preset low speed.

Power for driving the various pumps and the centrifuge separator 28 is provided via a P.T.O. shaft arrangement 171 (FIG. 2). The input shaft 172 would be connected to the power drive shaft of the fiber processing machine (not shown).

Machine 8 carries two fuel tanks 176 and 178 as a fuel source for the burner, fuel pump, fan, and controls, generally designated by the reference numbers 180 and 182, respectively, for boilers 40 and 42. An alternative arrangement would be to use a much larger boiler and a single fuel tank.

It will be appreciated from the foregoing description that the liquid processing machine 8 is a self-contained apparatus capable of separating the green liquid fraction of green vegetation into a leaf protein concentrate fraction and a brown liquid fraction as the machine moves through the field. The leaf protein concentrate fraction is collected in a protein collector tank.

When the brown liquid fraction is discharged from the centrifuge separator, its temperature is slightly below the coagulum temperature for the green liquid fraction. The portion of this heated brown liquid fraction is used as a liquid for producing steam. To raise the recirculated brown liquid fraction sufficiently to produce steam, it is necessary to raise its temperature a few degrees by passing it through a boiler prior to its introduction into injector 26. The remaining portion of the heated brown liquid fraction is passed through a heat exchanger prior to being collected in spray reservoir 46 for application to the field behind the machine 8. The heat of the brown liquid fraction delivered to heat exchanger 24 raises the temperature of the incoming green liquid fraction to just below the coagulum temperature of green vegetation.

It has been found through field testing that the brown liquid fraction that is returned to the field has a fertilizer value for the green vegetation crops. This is not surprising in view of the fact that the brown liquid fraction comprises water and a number of mineral compounds.

What is claimed is:

1. In a field-going machine for separating the green liquid fraction of a green vegetation crop into a leaf protein concentrate fraction and a brown liquid fraction, said field-going machine including:
   (a) a mobile frame adapted for travel in the field,
   (b) means mounted on said mobile frame for recirculating a portion of the brown liquid fraction and mixing said portion with an incoming green liquid fraction portion to cause coagulation,
   (c) means mounted on said mobile frame for separating the resulting coagulum into a brown liquid fraction and a leaf protein concentrate fraction, and
   (d) means mounted on said mobile frame for collecting the leaf protein concentrate fraction.

2. The combination of claim 1 further comprising:
   (a) means for delivering the remaining portion of the brown liquid fraction to a reservoir tank mounted on said frame,
   (b) means operatively connected to the reservoir tank for applying the brown juice fraction therefrom to the field over which the mobile frame is passing.

3. The combination of claim 2 further comprising heat exchanger means for transferring a portion of the heat of a part of said remaining portion of brown liquid fraction to said incoming green liquid fraction to preheat the same.

4. A combination of claim 2 further comprising motion detection means for interrupting the flow of the brown liquid fraction from said reservoir when the speed of said mobile frame drops below a predetermined velocity.

5. In a field-going machine for fractionating the green liquid fraction extracted from a green vegetation crop, said field-going machine comprising:
   (a) a mobile frame adapted for travel in farm fields;
   (b) means operatively mounted on said frame for separating said green liquid fraction into a leaf protein concentrate fraction and a brown liquid fraction,
   (c) means operatively mounted on said frame for delivering the brown liquid fraction to a reservoir tank,
   (d) means operatively mounted on said frame and operatively connected to the reservoir tank for applying said brown liquid fraction to a field behind said machine as it moves along,
   (e) means operatively mounted on said frame for detecting the motion of said mobile frame and for interrupting said spray application upon said mobile frame speed decreasing to a speed below a pre-set level to prevent flooding of the ground beneath said mobile frame.

6. In a field-going machine as defined in claim 5, further comprising:
   (a) means for delivering said brown liquid fraction to said spray application means when said speed sensor indicator has been activated and said reservoir tank fills to its capacity.

7. In a field-going machine for separating the green liquid fraction of a green vegetation crop into a leaf protein concentrate fraction and a brown liquid fraction, the combination comprising:
   (a) a mobile frame adapted for travel in farm fields;
   (b) means operatively mounted on said frame for heating the incoming green liquid fraction below its coagulation temperature,
   (c) means operatively mounted on said frame for recirculating a portion of the separated brown liquid fraction and for mixing it with the incoming green liquid fraction,
   (d) means operatively mounted on said frame for heating said recirculated brown liquid fraction portion sufficiently to cause it to produce steam when mixed with the green liquid fraction.

8. The combination of claim 7 further comprising temperature sensing control means for controlling the heat of said recirculated brown liquid fraction portion in a manner to cause a constant coagulation temperature.

9. The combination of claim 7 further comprising temperature sensor means for controlling the flow rate of said recirculated brown liquid fraction portion in a manner to produce a constant coagulation temperature.

10. The combination of claim 7 wherein said means for heating said incoming green liquid fraction comprises:
    (a) heat exchanger means for transferring heat from at least a portion of the remaining portion of said brown liquid fraction to said incoming green liquid fraction, and
    (b) temperature control means for adjusting the flow rate of said brown liquid fraction through said heat exhanger means to provide a constant predetermined temperature below the coagulation temperature of said green liquid fraction.

* * * * *